Figure 2A:
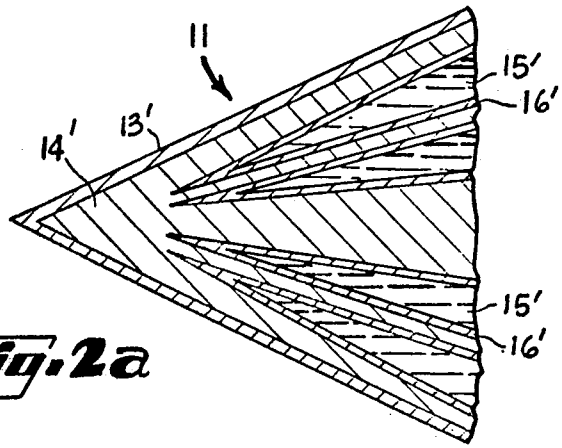
Figure 2B:
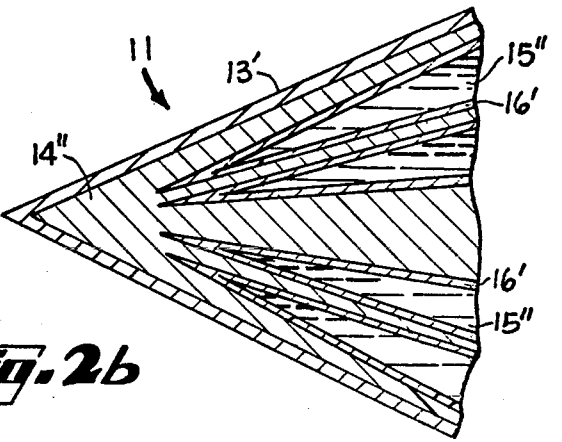
Figure 1A:
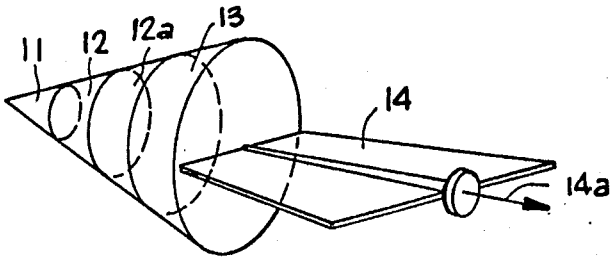
Figure 1B:
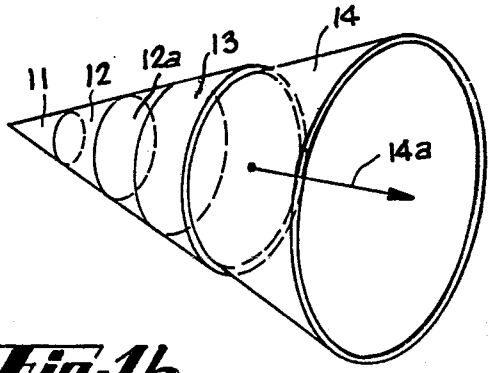
Figure 3A:
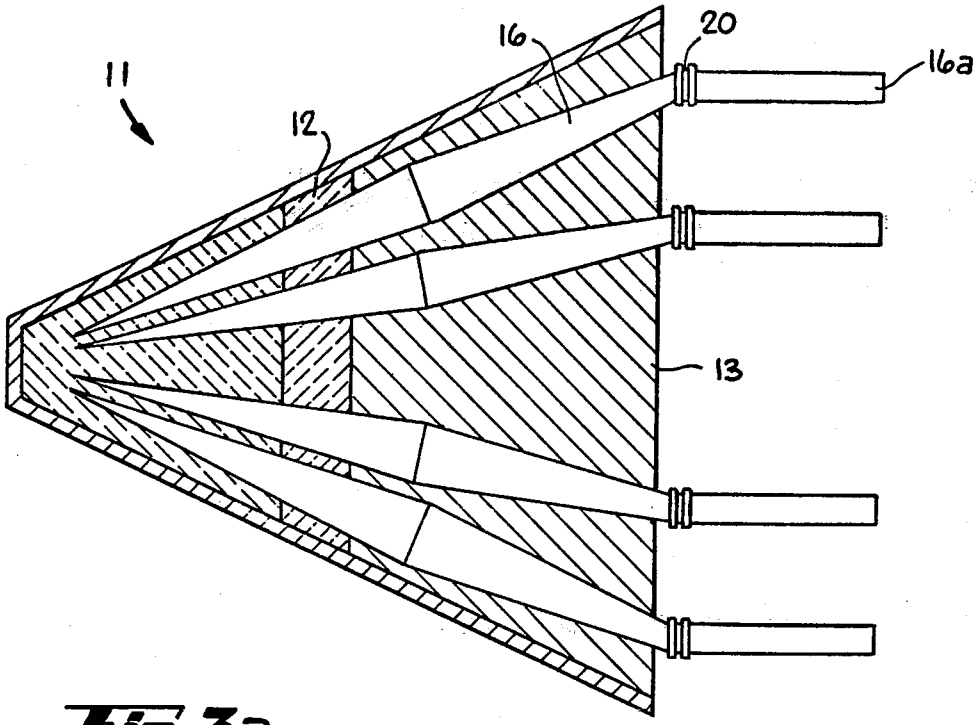
Figure 3B:
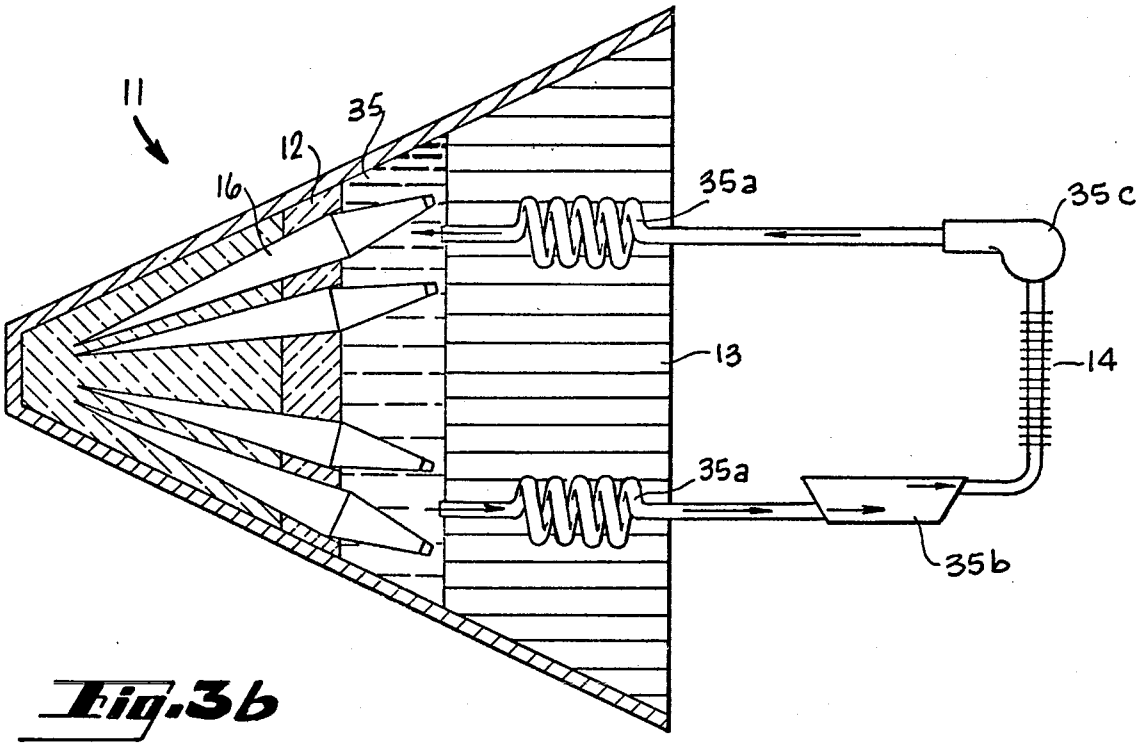
Figure 4:
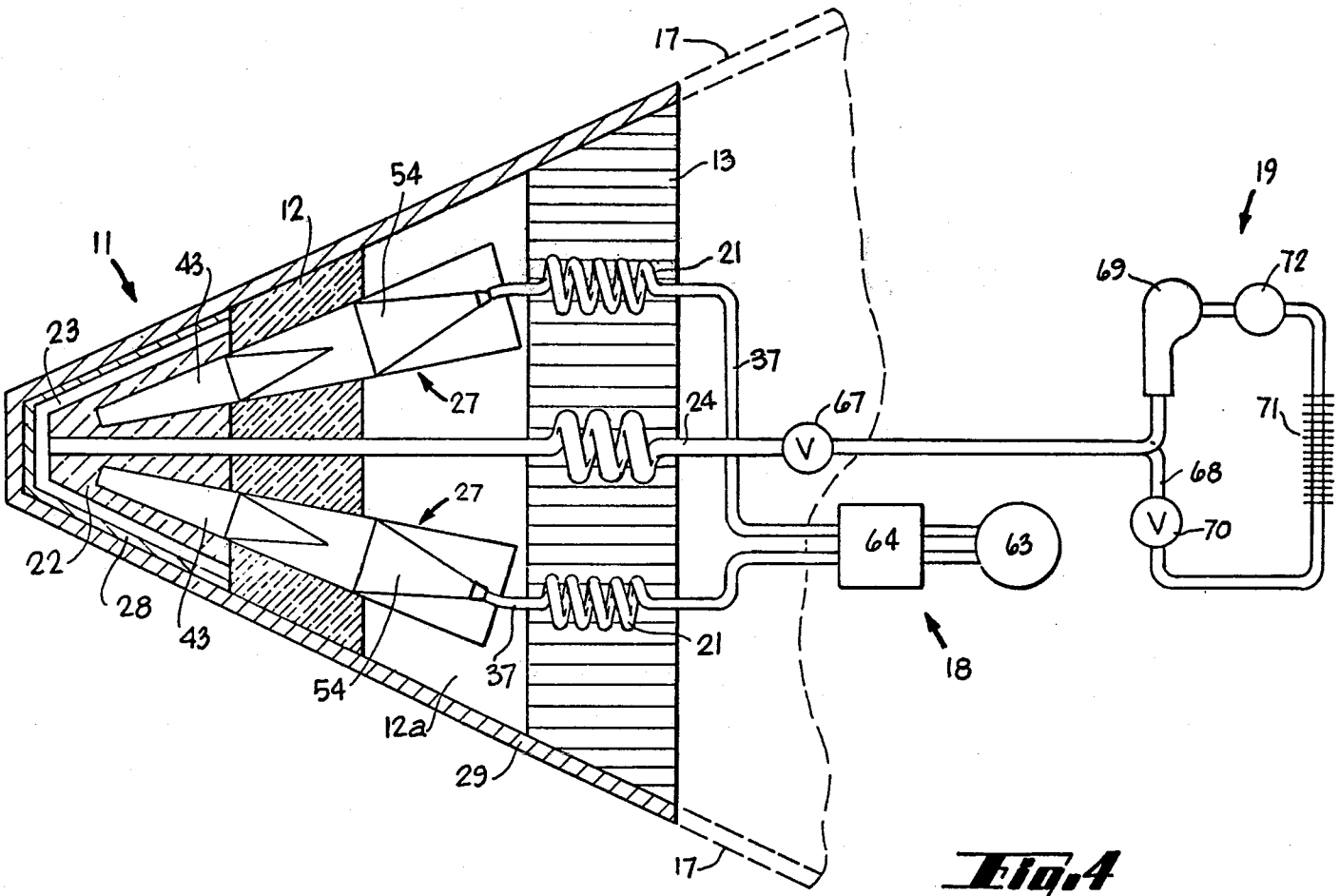
Figure 4A:
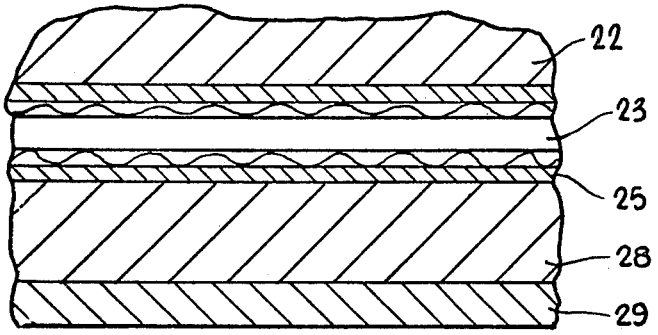
Figure 5A:
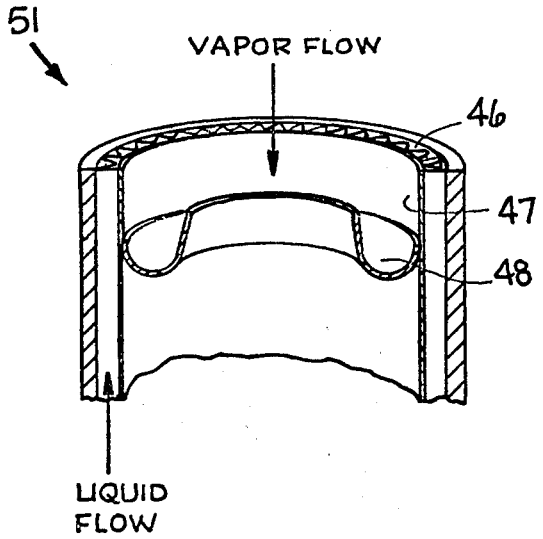
Figure 5:
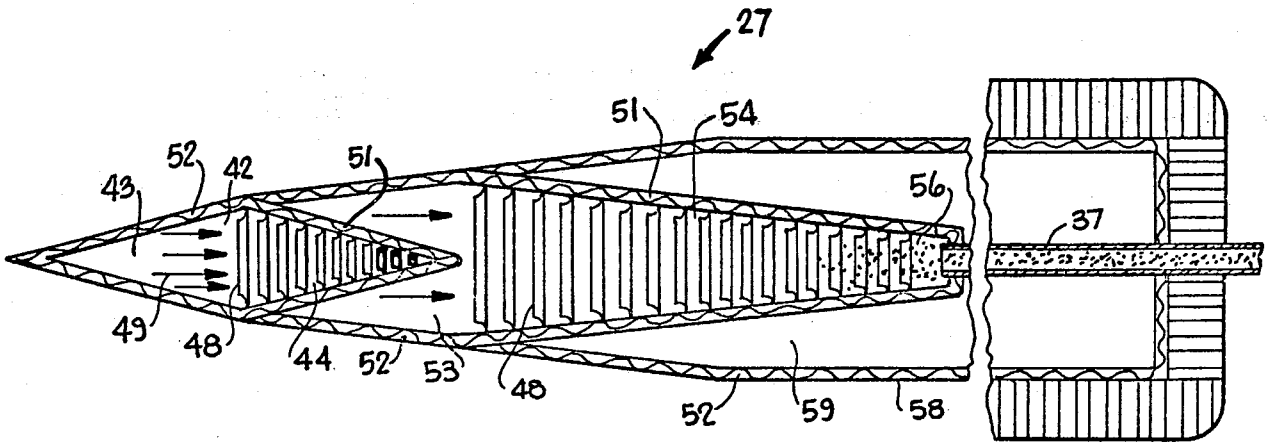
Figure 5B:
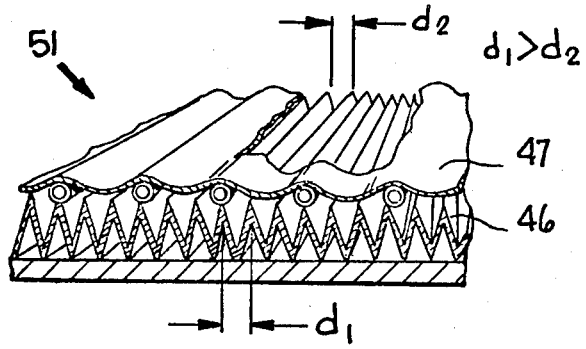
Figure 5C:
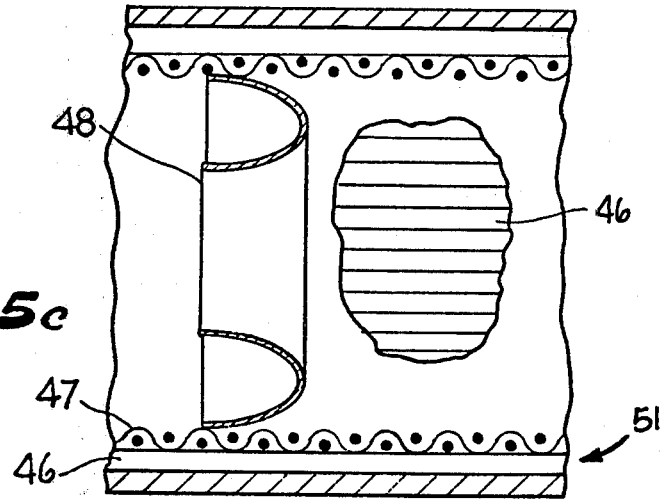
Figure 5D:
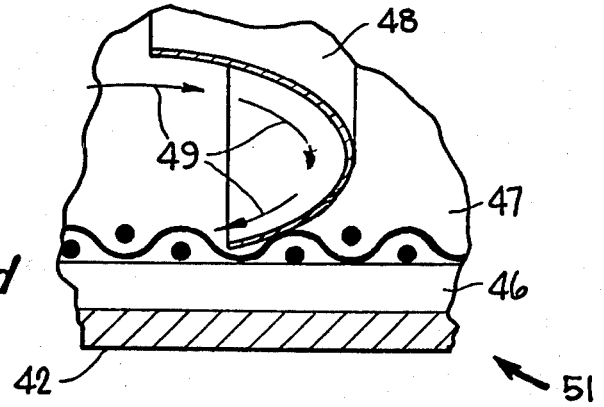

376-347
11/3/81
$$$ SR
XR T,101,204

United States Defensive Publication [19] (H) [11] T101,204
Hampel [43] Nov. 3, 1981

[54] COMPACT FAST NUCLEAR REACTOR USING HEAT PIPES

[76] Inventor: Viktor E. Hampel, 2783 Curlew Ct., Pleasanton, Calif. 94566

[21] Appl. No.: 197,464

[22] Filed: Oct. 16, 1980

[51] Int. Cl.[3] ..... G21C 15/00
[52] U.S. Cl. ..... 376/221; 376/317; 376/318; 376/329; 376/347; 376/367; 376/419

[57] ABSTRACT

A fast nuclear reactor is described which comprises a conical reactor core surrounding an embedded array of heat pipes of, per se, novel structure, carrying either moderator or nuclear fuel material as part of their working fluid. This reactor system is self-regulating, because an excessive increase in reactivity drives the fuel or moderator working fluid out of the conical core region, thereby reducing reactivity. The heat pipes are protected against burnout by a novel heat pipe envelope shape and internal wicking structure designed to increase the working fluid circulation speed with increasing heat transfer loads.

9 Claims, 7 Sheets Drawing,
35 Pages Specification

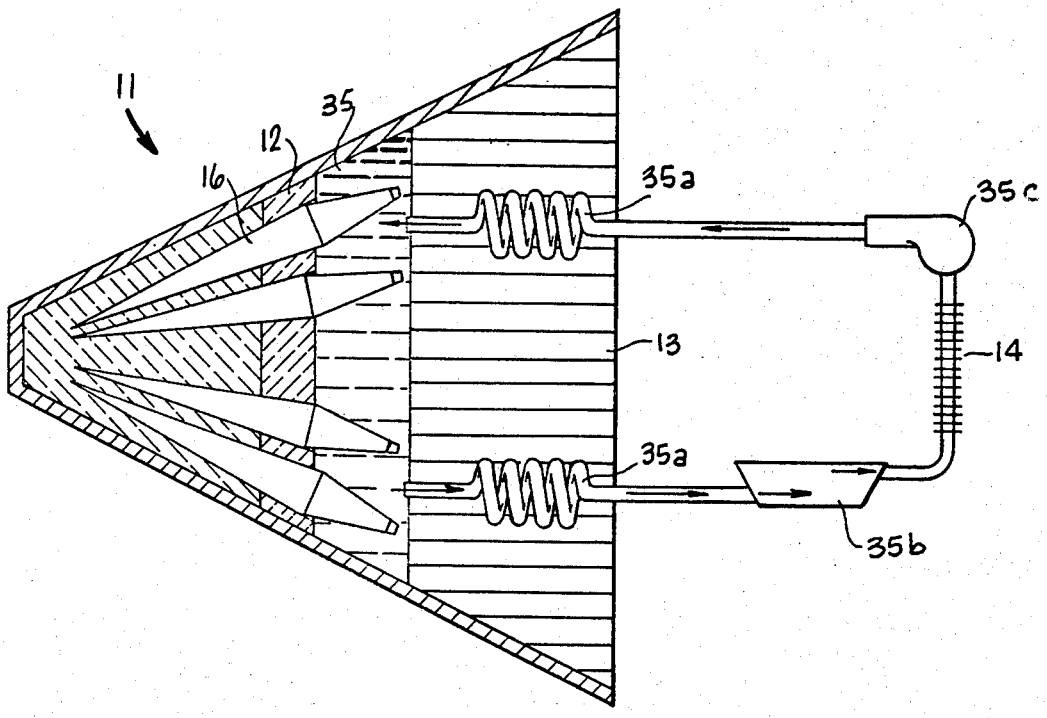

The file of this unexamined application may be inspected and copies thereof may be purchased (849 O.G. 1221, Apr. 9, 1968).